US005903215A

United States Patent [19]

Kanno

[11] Patent Number: 5,903,215

[45] Date of Patent: May 11, 1999

[54] APPARATUS AND METHOD DETECTING OPERATING CONDITION OF AN OIL PUMP

[75] Inventor: Isao Kanno, Hamamatsu, Japan

[73] Assignee: Sanshin Kogyo Kabushiki Kaisha, Hamamatsu, Japan

[21] Appl. No.: 08/841,160

[22] Filed: Apr. 29, 1997

[30] Foreign Application Priority Data

Apr. 30, 1996 [JP] Japan .................................... 8-130540

[51] Int. Cl.[6] ........................................................ B60Q 1/00

[52] U.S. Cl. ....................... 340/450.3; 340/438; 340/686; 417/63

[58] Field of Search ................................ 340/450.3, 438, 340/686, 603, 606, 610, 608; 417/63; 116/DIG. 21; 123/196 S; 184/108

[56] References Cited

U.S. PATENT DOCUMENTS

| | | | |
|---|---|---|---|
| 4,551,069 | 11/1985 | Gilmore | 417/13 |
| 4,913,108 | 4/1990 | Sougawa et al. | 123/196 S |
| 5,024,294 | 6/1991 | Van Fossen et al. | 184/108 |
| 5,159,910 | 11/1992 | Ninomiya et al. | 123/196 S |
| 5,390,762 | 2/1995 | Nelson | 123/196 S |
| 5,687,598 | 11/1997 | Kirii et al. | 72/21.5 |

*Primary Examiner*—Daniel J. Wu
*Assistant Examiner*—Sihong Huang
*Attorney, Agent, or Firm*—Knobbe, Martens, Olson & Bear LLP

[57] ABSTRACT

The present invention is an apparatus and method for detecting an operating condition of an oil pump of the type utilized in an oil supply system for a internal combustion engine. The apparatus includes a sensor for detecting the movement of a piston and/or a check valve of an oil pump. The apparatus preferably includes an engine control for monitoring the sensor over a fixed time interval and determining whether a signal is indicative of a malfunction or abnormality. In accordance with the method, the pump is monitored with the sensor and in the event an abnormality is detected, a warning indicator is activated and/or the engine is shut off.

13 Claims, 5 Drawing Sheets

APPARATUS AND METHOD DETECTING OPERATING CONDITION OF AN OIL PUMP

FIELD OF THE INVENTION

The present invention relates to an apparatus and method for detecting the operating condition of an oil pump of an oil supply system for an internal combustion engine.

BACKGROUND OF THE INVENTION

The supply of lubricating oil to an internal combustion engine is critical. In two-stroke engines, a mixture of oil and fuel is supplied to the combustion chambers of the engine. In some cases, the oil and fuel are premixed in a supply tank and the mixture is supplied to the engine via a delivery system.

In many other instances, oil is drawn from one source and fuel is drawn from another source. The oil is typically drawn from a tank through a delivery line by an oil pump. Similarly, the fuel is drawn from a tank by a fuel pump. The oil and fuel are mixed before delivery to the combustion chambers by routing oil pumped by the oil pump into the fuel system.

In the first case, oil is supplied to the engine as long as fuel is delivered to the engine. In the latter case, it is possible that the oil pump may fail and yet fuel is still delivered to the engine because the independent fuel pump is still operational. This may have detrimental consequences to the engine.

A system and method for detecting the operating condition of the lubricant delivery system, and more particularly, the operating condition of an oil pump of such a system, is desired.

SUMMARY OF THE INVENTION

In accordance with the present invention, there is provided a method and apparatus for detecting the operating condition of an oil supply system for an internal combustion engine. In the preferred embodiment of the invention, a sensor is provided for monitoring the operating condition of an oil pump of the oil supply system.

In a first arrangement, a sensor is provided for monitoring the movement of a piston of the oil pump. In a second arrangement, a sensor is provided for monitoring the operation of a check-valve of an outlet port of the pump.

Preferably, the engine is controlled by an engine control which monitors the sensor. In the event a malfunction occurs, as indicated by the sensor output, the engine control provides a warning indicator to the operator of the engine and/or shuts down the engine.

Further objects, features, and advantages of the present invention over the prior art will become apparent from the detailed description of the drawings which follows, when considered with the attached figures.

BRIEF DESCRIPTION OF THE DRAWINGS

FIG. 2(*b*) is a partial enlarged view of the oil pump illustrated in FIG. 2(*a*), illustrating a piston thereof in a first position;

FIG. 2(*c*) is a partial enlarged view of the oil pump illustrated in FIG. 2(*a*), illustrating the piston thereof in a second position;

FIG. 3(*b*) is a partial enlarged view of the oil pump illustrated in FIG. 3(*a*), illustrating an output check valve ball thereof in a first position;

FIG. 3(*c*) is a partial enlarged view of the oil pump illustrated in FIG. 3(*a*), illustrating an output check valve ball thereof in a second position;

DETAILED DESCRIPTION OF THE PREFERRED EMBODIMENTS OF THE INVENTION

In general, the present invention is a method and apparatus for determining the operating condition of an oil pump of a lubricant delivery system. Preferably, the lubricant delivery system is of the type utilized to deliver oil into a fuel system of an internal combustion engine of the type utilized to power an outboard motor.

Figure 1:
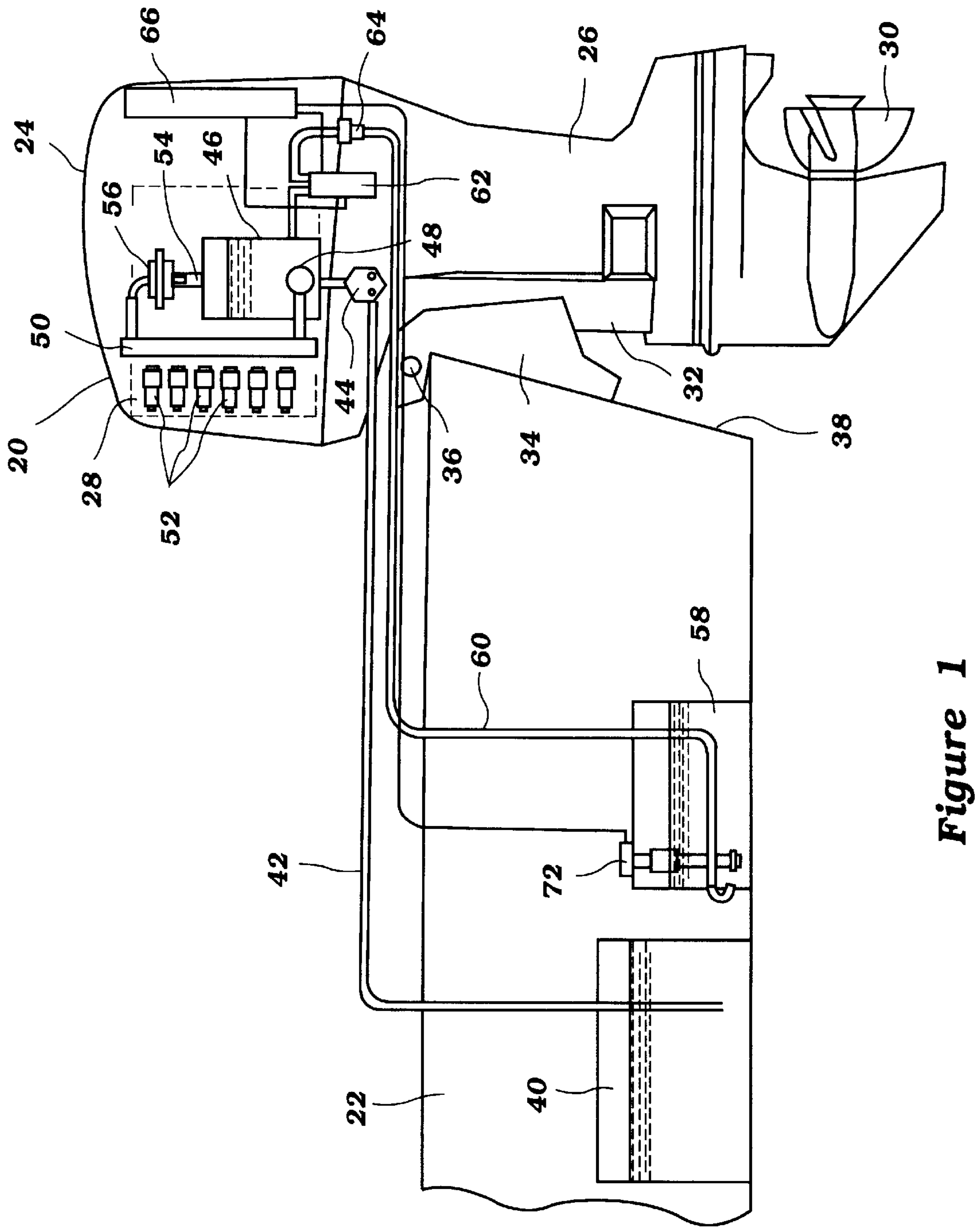
FIG. 1 is a side view of an outboard motor connected to a watercraft, the motor illustrated in partial cross-section exposing an oil and fuel system for an engine thereof.

Referring to FIG. 1, an outboard motor 20 is utilized to propel a watercraft 22. The motor 20 may be of any number of varieties. As illustrated, the motor 20 has a body generally defined by a cowling portion 24 and a lower unit 26 depending therebelow. An engine 28 is positioned within the cowling portion 24. The engine 28 is arranged in driving relation with a water propulsion device of the motor 20, whereby the motor 20 propels the watercraft 22. In the embodiment illustrated, the water propulsion device is a propeller 30.

The outboard motor 20 is arranged to move left or right with respect to the watercraft 22 for steering the watercraft. In addition, the motor 20 is arranged to tilt up and down with respect to the watercraft. The lower unit 26 is connected to a steering shaft (not shown) which is rotatably positioned about a vertical axis within a steering bracket 32. In turn, the steering bracket 32 is rotatably connected to a clamping bracket 34 about a generally horizontally extending pin 36. The clamping bracket 34 is connected to a transom portion of a hull 38 of the watercraft 22.

The engine 28 is of the internal combustion variety. The particular arrangement of the engine 28 may vary as known to those skilled in the art. By way of example only, the engine 28 may be of the rotary variety, or be of the piston and cylinder variety. If of the piston including type, the engine 28 may have as few as one cylinder, or many more than one. If the engine 28 has multiple cylinders, they may be arranged in in-line, "V", opposed or other arrangements. In addition, the engine 28 may operate on a four-cycle or two cycle principal. In the embodiment illustrated, the engine 28 has six cylinders arranged in in-line fashion.

Regardless of the specific engine orientation and operating principal, the engine 28 includes a fuel delivery system for delivering fuel to each combustion chamber thereof. Generally, the fuel system includes a fuel source or tank 40. In the embodiment illustrated, the tank 40 is positioned within the hull 38 of the watercraft 22. A fuel supply pipe 42 extends from the tank 40 to a low pressure fuel pump 44 positioned within the cowling portion 24 of the motor 20 near the engine 28. The low pressure fuel pump 44 is preferably of the diaphragm, pressure activated type.

An output of the low pressure fuel pump 44 leads to a vapor separator 46. The vapor separator 46 may of a number of types known to those skilled in the art, and is arranged to separate air from the fuel.

A high pressure pump 48, preferably positioned within the vapor separator 46, draws fuel from the separator 46 and delivers it under high pressure to a fuel rail 50. A fuel injector 52 corresponding to each cylinder of the engine 28 is utilized to deliver fuel from the fuel rail 50 into the combustion chamber portion of each cylinder for combustion. The high pressure pump 48 is preferably of the electric variety.

Fuel which is not delivered through the fuel rail 50 to the fuel injectors 52 is returned to the vapor separator 46 through a return line 54. A pressure valve 56 is positioned along the return line 54 for maintaining the fuel in the fuel rail 50 under high pressure, and yet allowing fuel to return to the separator 46.

An oil supply system is also provided for the engine 28. In the embodiment illustrated, the oil supply system provides oil into the fuel system for delivery with the fuel as an oil and fuel mixture to each injector 52.

The oil supply system includes an oil source or tank 58. Preferably, the tank 58 is positioned within the hull 38 of the watercraft 22. An oil supply pipe 60 leads from the tank 58 to an oil pump 62 positioned within the cowling portion 24. The oil pump 62 is preferably of the electric variety as described in more detail below. An oil filter 64 is preferably positioned along the oil supply pipe 60.

The output of the oil pump 62 leads to the vapor separator 46. In the vapor separator, the oil and fuel delivered thereto mixes. The mixture of oil and fuel is then drawn by the high pressure fuel pump 48 and delivered to the fuel injectors 52.

Figure 4:
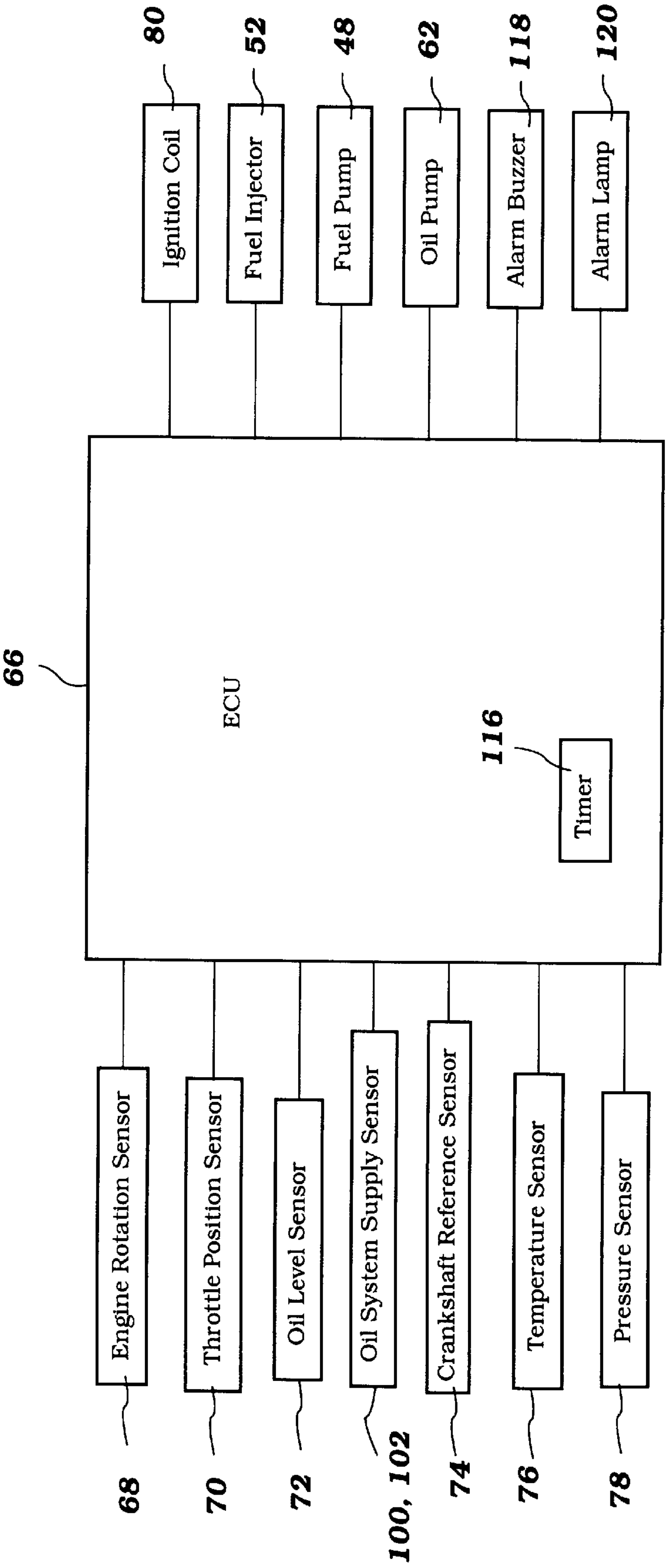
FIG. 4 is a schematic illustrating a control system of the motor illustrated in FIG. 1.

Many of the feature of the engine 28 are known to those skilled in the art, and thus not described in detail here. The engine 28 of the type illustrated generally has a crankshaft which is driven by a piston movably mounted in each cylinder. The crankshaft is arranged to drive the propeller 30 of the motor 20. The engine 28 includes an air supply system for supplying air to each combustion chamber for combustion of the fuel. A suitable throttle is provided for controlling the flow of air to the cylinders. A suitable ignition system is provided for igniting the air and fuel mixture in each combustion chamber. This ignition system may include a coil for providing an ignition spark in each combustion chamber via spark plug corresponding to each combustion chamber. engine control unit or ECU 66 is provided for monitoring various of the operating conditions of the engine 28, and for controlling various of the engine functions. FIG. 4 illustrates a number of engine parameters which the ECU monitors 66. An engine speed or rotation sensor 68 provides engine speed data to the ECU 66. A throttle position sensor 70 provides throttle position data to the ECU 66.

An oil level sensor 72 is preferably provided at the oil tank 58, as illustrated in FIG. 1. This sensor 72 provides data to the ECU 66 regarding the oil level in the tank 58.

A crankshaft reference position sensor 74 provides data to the ECU 66 regarding the specific angular position of the crankshaft of the engine 28. In addition, engine intake air pressure and temperature sensors 76,78 provide pressure and temperature to the ECU 66 for use in calculating necessary fuel delivery rates. These sensors are known to those skilled in the art.

As is well known in the art of engine control, the ECU 66 utilizes the sensor data to optimize engine operating parameters. For example, the ECU 66 utilizes the data to charge the ignition coil(s) 80 and selectively fire the ignition element corresponding to each cylinder at the correct time. The ECU 66 also activates each fuel injector 52 (such as by providing an electric signal to the fuel injector 52 when of the electric solenoid type) at the correct time for injecting fuel into each combustion chamber. In addition, the ECU 66 sends electric signals to the electric high pressure fuel pump 48 and oil pump 62 for providing oil and fuel to the engine 28.

In accordance with the present invention, a method and apparatus are provided for detecting the operating condition of the oil supply system. In the preferred embodiment, means are provided for sensing an operating condition of the oil pump 62 and for controlling the engine 28 in accordance with the sensed condition.

Figures 2A, 2B, 2C:
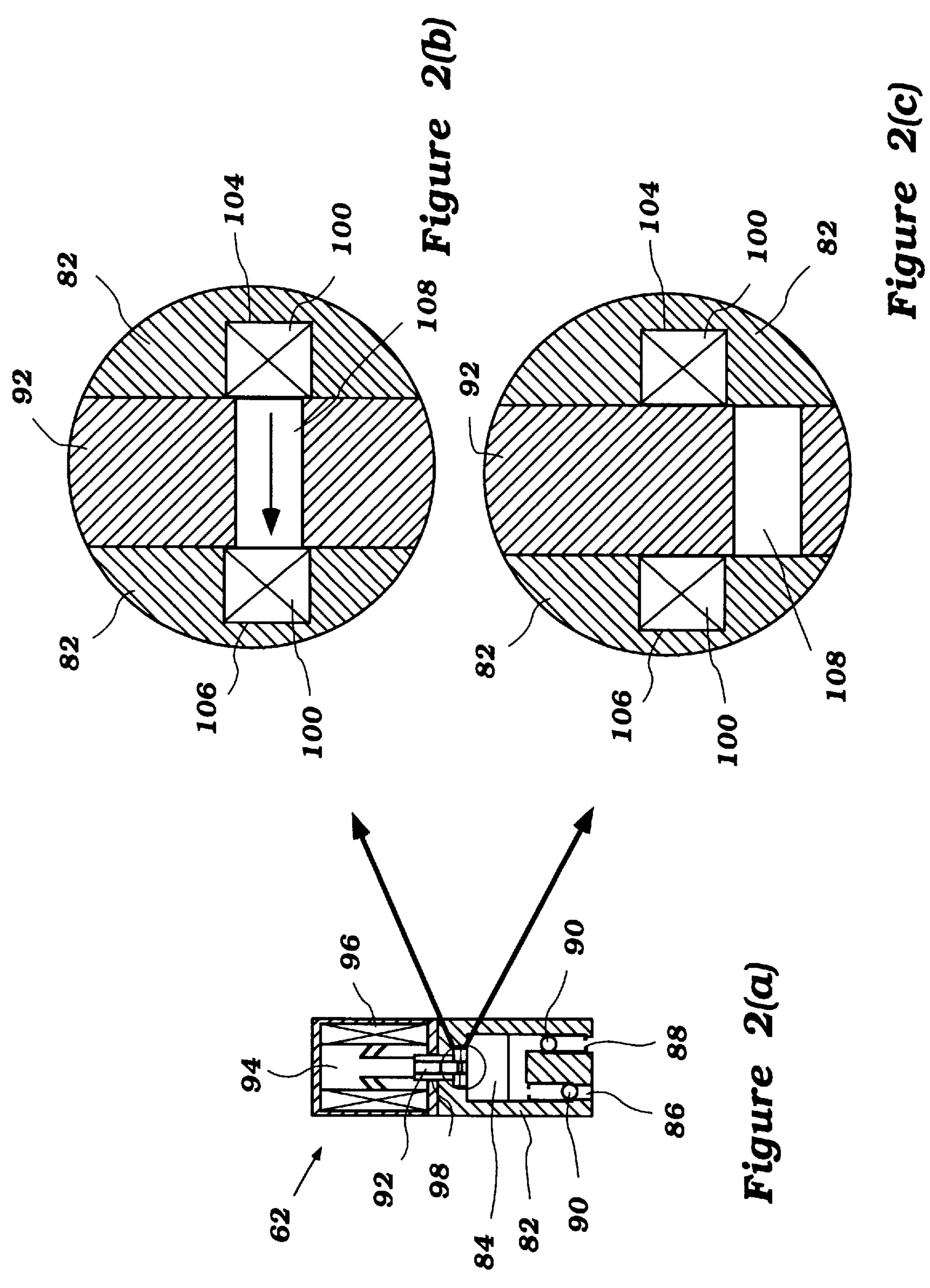
FIG. 2(*a*) is a cross-sectional view of an oil pump of the oil system illustrated in FIG. 1, the oil pump including a first operating condition sensor in accordance with the present invention.

In a first arrangement, as illustrated in FIGS. 2(*a*–*c*), the oil pump 62 is of the solenoid operated variety, having a body 82. A piston 84 is movably positioned within a chamber of the body 82. An inlet port 86 leads to the chamber. In the embodiment illustrated, the oil supply pipe 60 leads to the inlet port 86. Similarly, an outlet port 88 leads from the chamber. In the embodiment illustrated, a pipe is connected to the outlet port 88 and extends to the vapor separator 46. A ball-type check valve 90 is provided in both the inlet and outlet ports 86,88 for controlling the flow of oil in and out of the pump 62, as described in more detail below.

A stem 92 portion of the piston 84 extends in the opposite direction of the chamber through a guide, where it is connected to a plunger 94. The plunger 94 is preferably at least partly metallic and is positioned within a coil 96, thereby forming a solenoid where an electric charge applied to the coil 96 causes movement of the plunger 94, and the piston 84 connected thereto. Since the solenoid moves the piston 84 in only one direction, a return spring 98 is provided about the stem 92 portion of the piston 84 for moving the piston in the opposite direction.

Operation of the pump 62 is as follows. When piston 84 is retracted, as illustrated in FIG. 2(*a*), the solenoid is activated, and the plunger 94 moves downwardly, also forcing the piston 84 downwardly. As the pressure of the oil within the chamber increases, the check valve 90 in the outlet port 88 moves to a position which allows oil to pass therethrough. Notably, the same pressure effectuates a closure of the check-valve 90 in the inlet port 86, preventing the flow of oil from the chamber back into the oil supply pipe 60.

After the oil has been expelled and the solenoid de-activated, the return spring 98 causes the piston 84 to move back upwardly to its original position. As the pressure within the chamber lowers during this movement, oil is drawn through the check valve 90 in the inlet port 86 into the chamber from the oil supply pipe 60. At the same time, the check valve 90 in the outlet port 88 closes, preventing oil which has been delivered to the output pipe from being drawn backwardly into the pump 62.

It is sometimes the case that this type of pump 62 fails, causing the delivery of oil by the oil supply system to cease. One problem associated with these types of pumps 62 is that the piston 84 may seize, the spring 98 may break or another problem with the pump may cause the piston 84 to quit moving, thus preventing the pumping of the oil.

In accordance with a first arrangement of the pump 62, a piston sensor 100 is provided for detecting movement of the piston 84 to determine whether the pump 62 is operational.

As illustrated in FIGS. 2(*b*) and 2(*c*), a photoelectric diode or similar light emitting device (LED) 104 is positioned in the body 82 of the pump 62. A light detector 106 is provided in an opposite side of the body 84.

The detector 106 is adapted to send a signal to the ECU 66 indicating its condition as on (i.e. when a light is detected) or off (i.e. when no light is detected). In addition, a passage 108 is provided in the stem 92 through which light may pass from the light emitting device 104 to the detector 106 when the stem 92 is in a specific position.

In operation, the stem 92 of the pump 62 moves up and down. The light emitting device 104 emits light. When the passage 108 through the stem 92 is in the position illustrated in FIG. 2(*b*), the light is detected by detector 106 and an appropriate signal is sent to the ECU 66. When the stem 92 moves and the passage 108 is not aligned, as in FIG. 2(*c*), the light detector 106 is not triggered by the light, and sends an appropriate signal to the ECU 66.

Use of the sensor 100 in controlling the engine 28 is described in more detail below.

Another method of detecting whether the pump 62 is operating is to monitor the movement of the ball of the ball-type check valve 90 of the inlet or outlet ports 86,88. This particular method is advantageous also because sometimes the check valve 90 of the outlet port 88 may fail, and while the piston 84 is still moving, no oil is allowed out of the pump 62. In a second arrangement of the pump 62, a check-valve sensor 102 is provided for monitoring the check-valve.

Figures 3A, 3B, 3C:
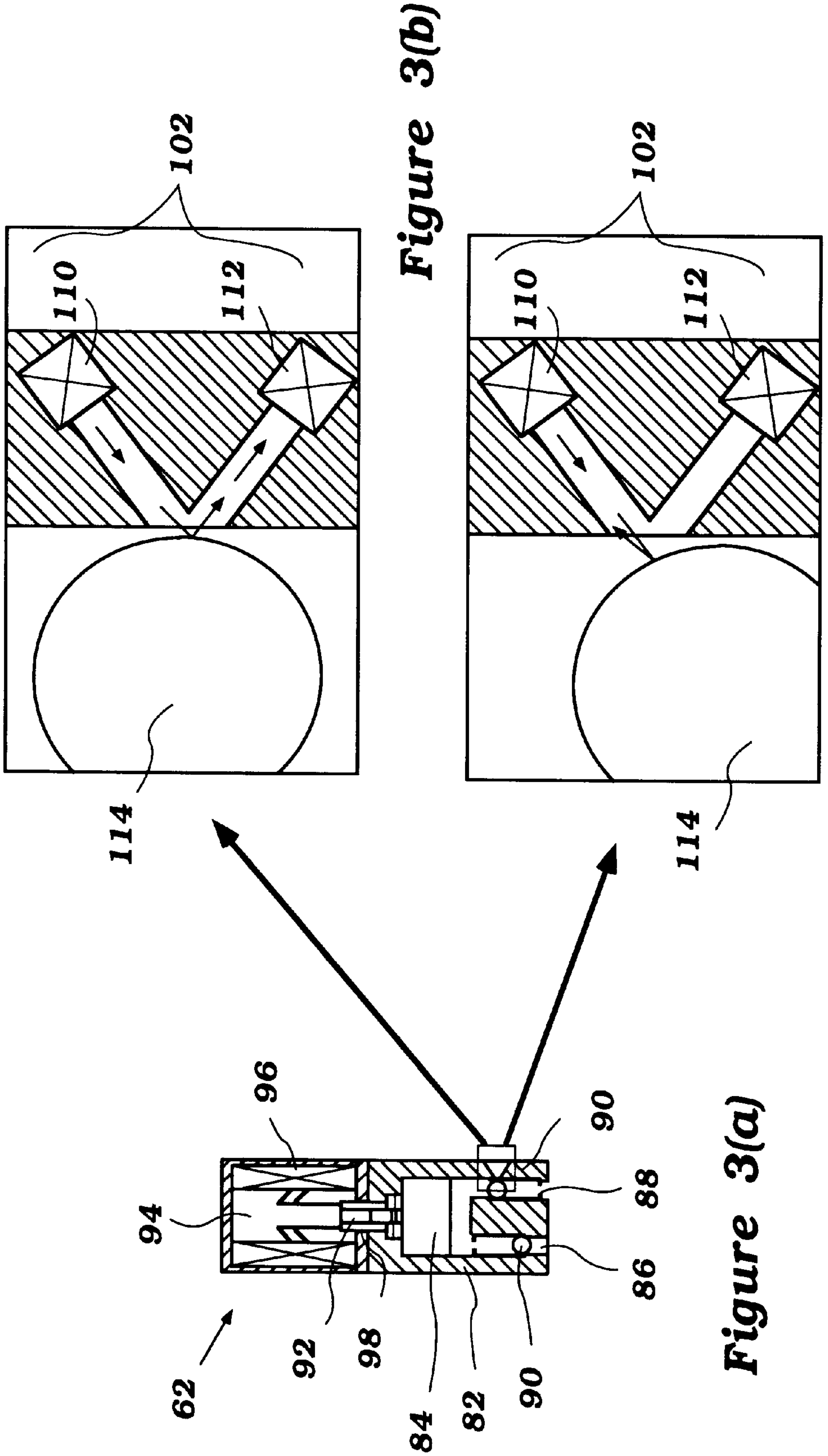
FIG. 3(*a*) is a cross-sectional view of an oil pump of the oil system illustrated in FIG. 1, the oil pump including a second operating condition sensor in accordance with the present invention.

As illustrated in FIGS. 3(*a–c*), the sensor 102 is preferably similar to that described above. A photoelectric diode or similar LED 110 is provided in the body 82 of the pump 62. A detector 112 is provided in the body near the LED 110, and in a position such that when a ball 114 of the check-valve 90 is in a position, light emitted from the LED 110 is transmitted to the detector 112, while in other positions the light is not so transmitted.

It is possible to include both a piston and check-valve sensor 100,102 on the same pump 62. In addition, it is possible to arrange the check-valve sensor 102 to monitor the check-valve corresponding to the inlet port 86.

Figure 5:
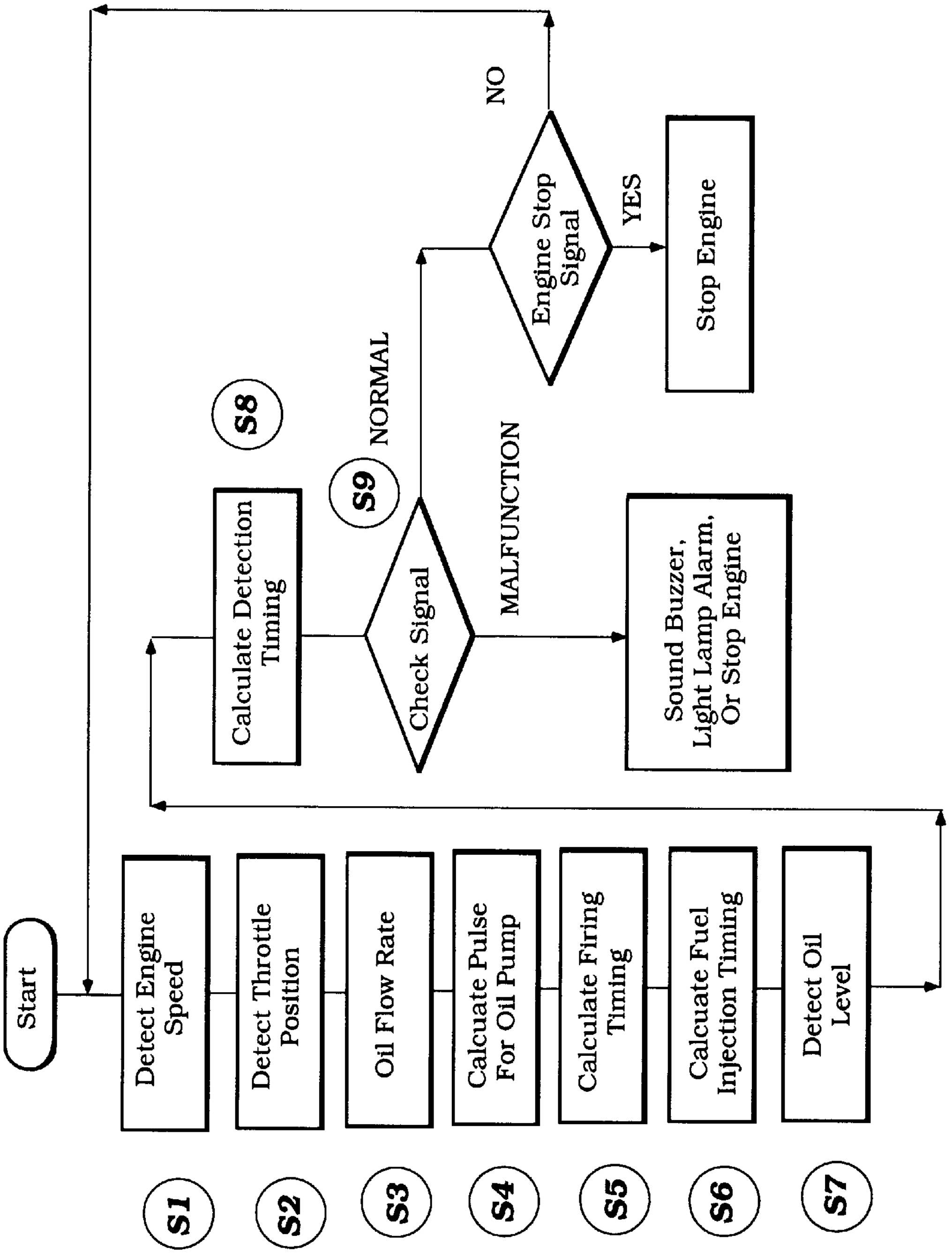
FIG. 5 is a flowchart of an operating sequence of the engine control of the motor.

As illustrated in FIG. 5 the ECU 66 preferably includes a specific operating sequence for monitoring the various engine sensors and controlling the engine 28. Preferably, this operating sequence is as follows. In a step S1, the ECU 66 detects the engine speed from the speed sensor 68. In a step S2, the ECU 66 detects throttle position from the throttle position sensor 70. In a step S3, the ECU 66 determines the necessary flow rate of oil from the pump 62 to the engine by an appropriate sensor. In a step S4, the ECU 66 calculates a timing or pulse for the oil pump 62 for causing the oil to be delivered in the desired amount. In a step S5, the ECU 66 calculates the firing interval or "timing" for firing the ignition coil 80, and thus the ignition elements and fires the elements accordingly.

In a step S6, the ECU 66 calculates a fuel injection timing interval, and activates the fuel injectors 52 in accordance with this timing, providing fuel to the combustion chambers.

In a step S7, the ECU 66 detects an oil level from the oil level sensor 72. In the event the oil level is lower than a predetermined level, the ECU 66 may activate a warning lamp or buzzer.

In a step S8, the ECU 66 preferably calculates a time interval for monitoring the output of the sensors 100,102. The ECU 66 preferably includes a timer 116 which the ECU 66 activates, starting this time interval. The ECU 66 then monitors the sensor(s) 100,102 until the timer 116 indicates the end of the interval. The ECU 66 is arranged to detect the output signal from the detector 106,112. In the event an "off" signal or an "on" signal is received continuously from the detector 106,112, then a malfunction is indicated, as described below.

Thus, as in step S9, if the appropriate succession of "off" or "on" or "on" and then "off" signals are received, no malfunction of the pump 62 is indicated. In that event, the ECU 66 goes on to determine if the operator of the watercraft has activated a kill switch. If the kill switch is indicated as activated, the ECU 66 effectuates a stoppage of the engine. If not, the ECU 66 continues its monitoring process, repeating the steps described above.

If a succession of "on" or a succession of "off" signals are received, then a malfunction of the pump 62 is indicated. In that event, the ECU 66 preferably lights a warning lamp 120, sounds an alarm 118 or shuts of the engine 28 (such as by ceasing to cause the ignition elements to fire). Other warnings may be provided, all with the goal of informing the watercraft operator that a malfunction has occurred with the oil supply system.

Preferably, this operating sequence is performed as fast as is necessary to effectively monitor and control the engine, as may be appreciated by those skilled in the art.

Of course, the foregoing description is that of preferred embodiments of the invention, and various changes and modifications may be made without departing from the spirit and scope of the invention, as defined by the appended claims.

What is claimed is:

1. A monitoring system for monitoring the operating condition of an oil supply system including an oil pump assembly, said oil pump assembly including an element that reciprocates during normal operation of said oil pump assembly, said monitoring system comprising detecting means for detecting the position of said element of said oil pump, means for transmitting a signal indicative of a position of said element as detected by said means for detecting, and a control device for determining a malfunction of said oil pump assembly if said element does not experience position changes in a predetermined sequence within a predetermined time interval.

2. The monitoring system in accordance with claim 1, wherein said element comprises a piston of said oil pump assembly.

3. The monitoring system in accordance with claim 2, wherein said piston has a stem extending therefrom to an actuating device, said stem having a passage therethrough, and wherein said detecting means comprises a light emitting device positioned on one side of said stem and a light detecting device positioned on an opposite side of said stem and arranged to receive light from said light emitting device through said passage when said stem is in one position, said stem blocking light emitted by said light emitting device when in another position.

4. The monitoring system in accordance with claim 3, wherein said light detecting device includes means for transmitting a signal to said control device indicating detection of light.

5. The monitoring system in accordance with claim 1, wherein said element comprises a valve of said oil pump assembly.

6. The monitoring system in accordance with claim 5, wherein said oil pump assembly has an outlet port check-valve with a moving ball and said element comprises said moving ball.

7. The monitoring system in accordance with claim 1, further including a visible warning device, said control device adapted to activate said visible warning device in response to an indication of malfunction.

8. The monitoring system in accordance with claim 1, further including an audible warning device, said control device adapted to activate said audible warning device in response to an indication of malfunction.

9. The monitoring system in accordance with claim 1, further including timer means for determining said predetermined time period.

10. A monitoring system in accordance with claim 1, wherein said control device disables the operation of an associated engine in the event a malfunction is indicated.

11. The monitoring system in accordance with claim 1 wherein the detecting means comprises a light emitting device positioned on one side of the element and a light receiving device positioned on said one side of said element and spaced from said light emitting device, said element being effective to reflect light from said light emitting device to said light receiving device in a first position of said element and to not effect reflection of light from said light emitting device to said light receiving device in a second position thereof.

12. The monitoring system as set forth in claim 11, wherein the element comprises a ball.

13. The monitoring system in accordance with claim 12, wherein the ball comprises a ball of a check valve assembly which forms a part of the oil pump assembly.

* * * * *